United States Patent [19]

Ueno et al.

[11] Patent Number: 4,660,382

[45] Date of Patent: Apr. 28, 1987

[54] DEVICE FOR CONTROLLING THE SUPERCHARGING PRESSURE OF A TURBOCHARGER

[75] Inventors: Takashi Ueno, Yokosuka; Toshimi Abo; Akio Sumizawa, both of Yokohama, all of Japan

[73] Assignee: Nissan Motor Co., Ltd., Yokohama, Japan

[21] Appl. No.: 706,626

[22] Filed: Feb. 28, 1985

[30] Foreign Application Priority Data

Feb. 29, 1984 [JP] Japan .................................. 59-36107

[51] Int. Cl.⁴ ............................................. F02B 37/12
[52] U.S. Cl. ...................................................... 60/602
[58] Field of Search ................... 60/600, 601, 602, 603

[56] References Cited

U.S. PATENT DOCUMENTS 4,177,006 12/1979 Nancarrow ........................ 60/602 X

FOREIGN PATENT DOCUMENTS

| 46872 | 3/1982 | European Pat. Off. | ............... 60/600 |
| 18522 | 2/1983 | Japan | ..................... 60/602 |
| 135340 | 8/1983 | Japan | ..................... 60/602 |

*Primary Examiner*—Michael Koczo
*Attorney, Agent, or Firm*—Schwartz, Jeffery, Schwaab, Mack, Blumenthal & Evans

[57] ABSTRACT

A supercharging pressure controller for a turbocharger. The supercharging pressure control device according to the present invention includes a drive device for driving a valve of a variable geometry mechanism which varies the flow area in the exhaust gas channel, a drive device for driving a valve provided in a bypass channel into which the exhaust gas is introduced to bypass the exhaust gas turbine, and a pressure sensor for detecting the supercharging pressure of the inlet air to the internal combustion engine. A control value obtaining device obtains a value for controlling the variable geometry mechanism drive device in accordance with the RPM of the engine and a value of the added load on the engine calculated thereby. A first control device controls the variable geometry mechanism drive device, using a control value obtained by compensating the control value from the control value obtaining means in accordance with a first target supercharging pressure set value and the detected value obtained by the pressure sensor at the time when the engine is in a predetermined operating region. A second control device controls the bypass channel valve drive device, using a control value obtained by compensating the control value from the control value obtaining device in accordance with a second target supercharging pressure set value and the detected value obtained by the pressure sensor at the time when the engine is in another operating region. A cutoff device cuts off the compensating control by the first control device. A recording control device records a compensated value from the second control device and controls the bypass channel valve drive device with the activation of the cutoff device by the recorded compensated value at the time when an abnormality or malfunction of the supercharging pressure detection device is recognized.

11 Claims, 12 Drawing Figures

DEVICE FOR CONTROLLING THE SUPERCHARGING PRESSURE OF A TURBOCHARGER

BACKGROUND OF THE INVENTION

1. Field of the Invention

The present invention relates in general to a turbocharger, and, more specifically, to a device for controlling the supercharging pressure of the turbocharger.

2. Description of the Present Art

In an internal combustion engine equipped with a turbochager, the turbocharger is usually controlled by means of an exhaust gas bypass mechanism which reduces the volume of exhaust gas flowing to the turbine by bypassing this exhaust gas. The pressure at the throttle throat of the turbine is determined by the capacity of the turbine. Accordingly, when a turbine with a small flow capacity is used, the torque is increased at low engine speed and decreased at high engine speed. When a turbine with a large flow volume is used, the torque is increased at high speed, but is reduced at medium and low engine speeds. Therefore, proposals have been put forward in the past for a variable capacity turbocharger in which it is possible to increase the torque from low engine speed to high engine speed by varying the geometry of the turbine in conformance with the operating conditions of the engine.

As a conventional variable capacity turbocharger and its control device, the device known from the Japanese Utility Model for opposition No. 53-50310 is given as an example. This proposal device is illustrated in FIGS. 1 to 4, in which a turbocharger is provided with a variable geometry device 3 comprising a movable member 4, a rod 5, and an actuator 6. The variable geometry device 3 is regulated by the degree of opening of a scroll throttle throat 2A according to the detected revolutions per minute of the engine and the position of an accelerator rack 9.

However, in the control device of this type of conventional variable capacity turbocharger, the degree of opening of the scroll throttle throat 2A is specifically determined from the engine RPM and the position of the accelerator rack 9. As a result, a change in the supercharging pressure will result, conforming to any change in the temperature of the inlet air, atmospheric pressure, and octane rating of the fuel, or a change in the intake air flow volume resulting from the individual characteristics of the engine. Therefore, the optimum supercharging pressure corresponding to the operating conditions of the engine cannot be obtained.

Figure 1:
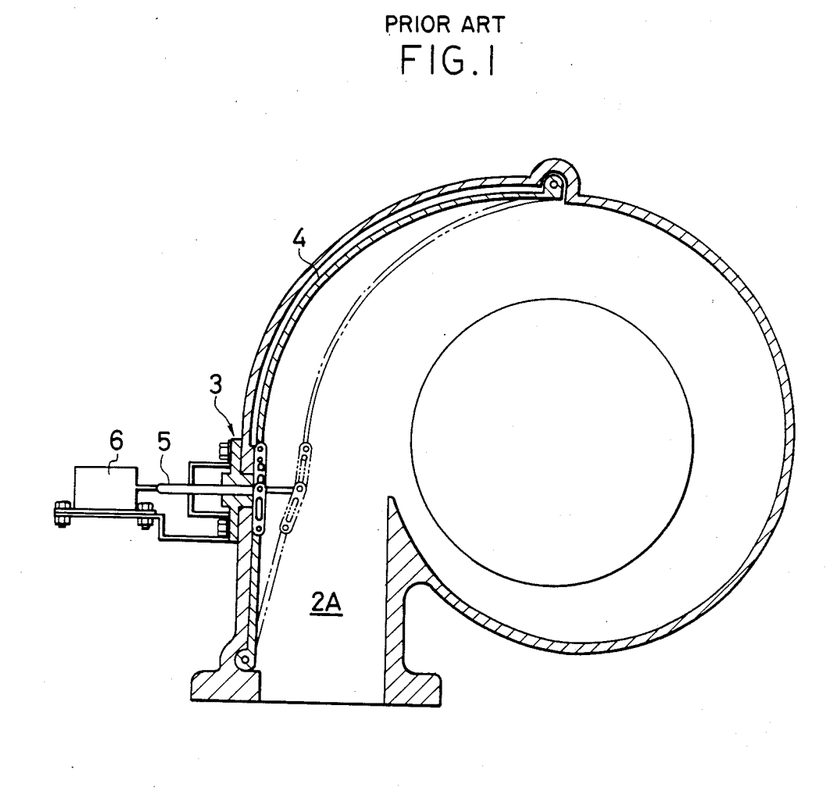
FIG. 1 is a sectional drawing of a scroll of a supercharging pressure control device for a turbocharger in accordance with conventional technology
Figure 2:
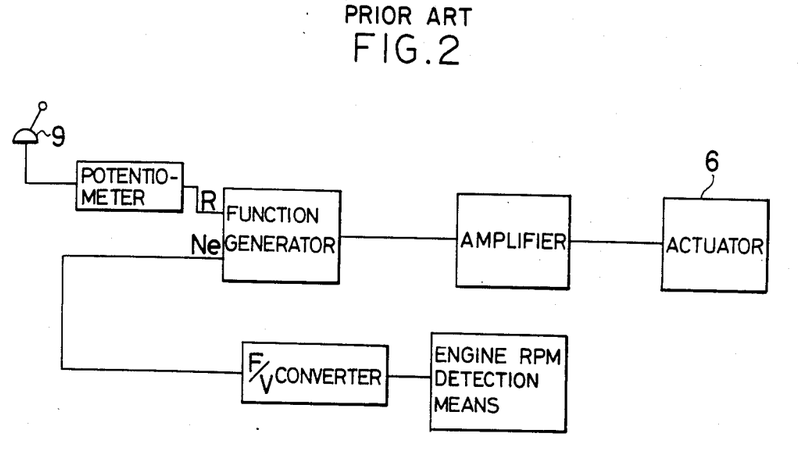
FIG. 2 is a block diagram of the supercharging pressure control device shown in FIG. 1.
Figure 3:
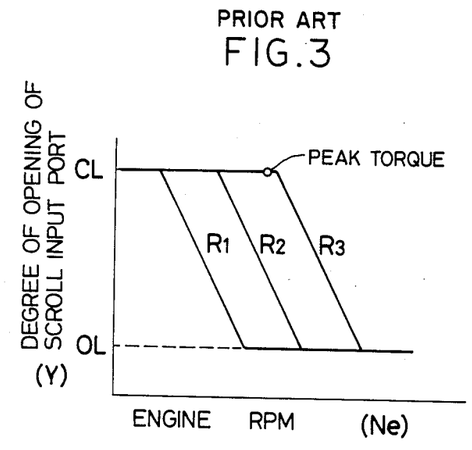
FIG. 3 and FIG. 4 are graphs illustrating the relationship between the degree of opening of the scroll intake port and the RPM of the engine.
Figure 4:
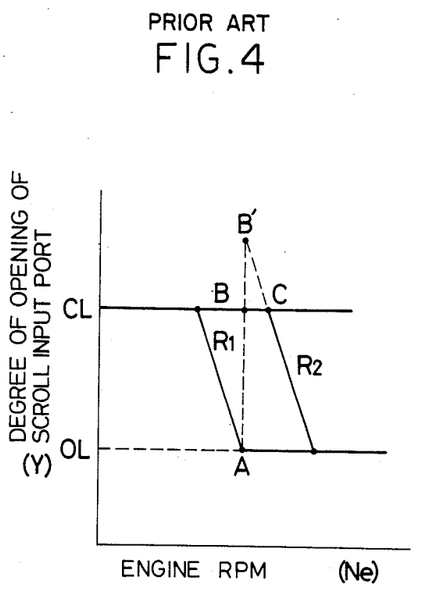
Figure 5:
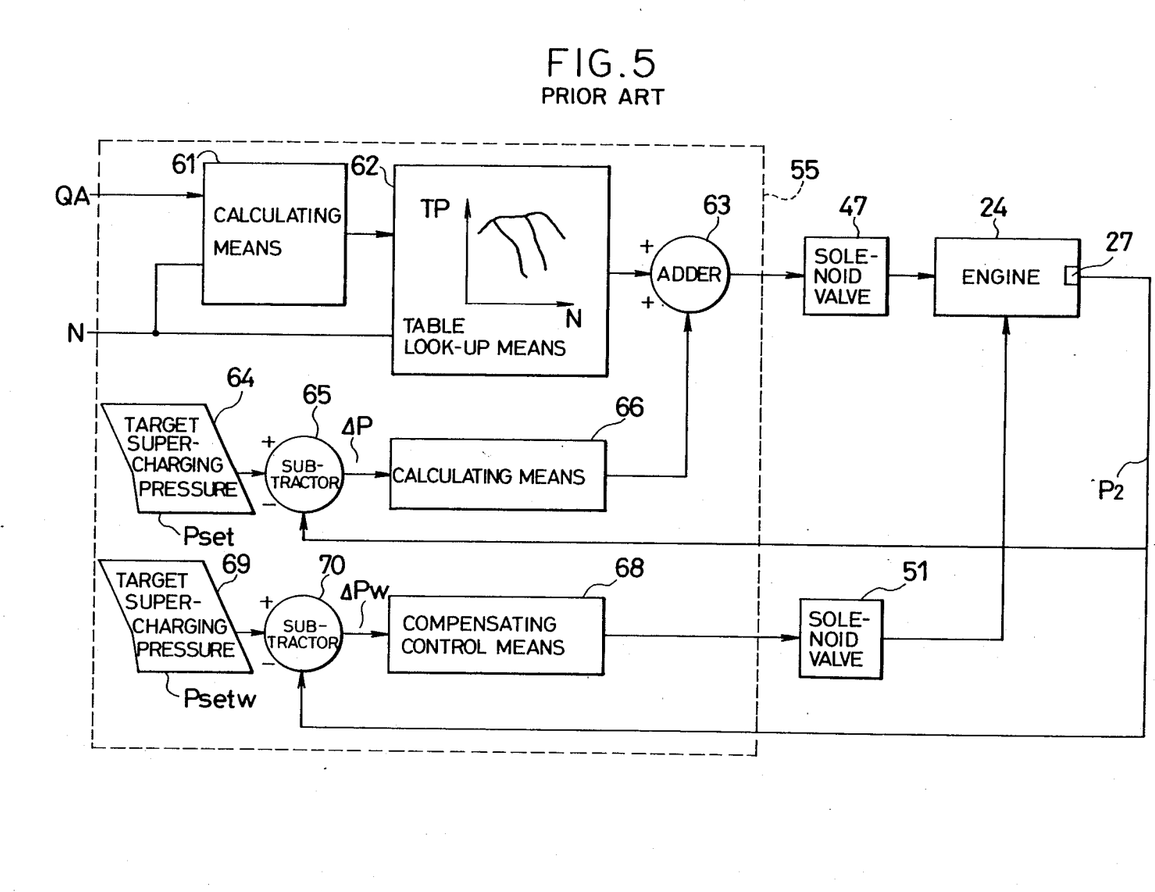
FIG. 5 is a block diagram of a supercharging pressure control device shown in FIG. 2.

Accordingly, in order to obviate this type of problem, a supercharging pressure control device for a turbocharger, such as the device illustrated in FIG. 5, has been considered. This supercharging pressure control device for a turbocharger has a control unit 55 for providing revised control of the engine supercharging pressure based on the detected supercharging pressure value obtained from a supercharging pressure sensor 27 provided in an engine 24. The control unit 55 comprises a plurality of calculating means 61 and 66, a table look-up means 62, an adder 63, a plurality of setting means 64 and 69 for setting the objective supercharging pressure, a plurality of subtractors 65 and 70, and a compensating control means 68.

More particularly, in the variable geometry mechanism of the turbine, a feedforward control system which comprises the control means 61, the table look-up means 62, the adder 63, a solenoid valve 47, and the engine 24, compensates for the supercharging pressure control which has been performed with a first feed back control system comprising an objective supercharging pressure setting means 64, a subtractor 65, and a calculating means 66. On the other hand, in the exhaust gas bypass mechanism, the previously mentioned feed forward control system performs compensating control on the supercharging pressure control which has been performed, with a second feed back control system comprising a target supercharging pressure setting device 69, a subtractor 70, a compensating control means 68, and a solenoid valve 51.

However, in a supercharging pressure control device for a turbocharger, such as is described above, the supercharging pressure sensor 27, in the case where a breakdown such as a broken wire, etc. is produced, and the correct detected value cannot be outputted to a control unit 55, there is the problem that normal supercharging pressure control becomes impossible. In addition to this, in a high pressure, high load region, such as the region (C) illustrated in FIG. 6, when the actual supercharging pressure exceeds the normal value, the supercharging pressure sensor 27 breaks down. In the case where a detected value lower than the actual supercharging pressure is given to the control unit 55, the control system activates the supercharging pressure to an even higher value. In the worst case, engine damage can occur.

SUMMARY OF THE INVENTION

An object of the present invention is to provide a supercharging pressure control device for a turbocharger with which an almost optimum supercharging pressure control is possible and no damage is caused to the engine from an abnormally high supercharging pressure even when the supercharging pressure control sensor breaks down.

Briefly described, this object of the present invention is accomplished by the provision of a supercharging pressure control device for a turbocharger comprising a valve mechanism 105, for driving the valve of a variable geometry mechanism to vary the area of a flow channel in an exhaust gas channel; a valve mechanism 117, for driving a valve provided in a channel which causes the exhaust gases to be bypassed; a detection means 109 for detecting the supercharging pressure of the inlet air to an internal combustion engine; a detection means 103 for detecting the drive condition of the internal combustion engine; a control-value-obtaining means 101 for obtaining a value for controlling the opening and closing of a valve for the previously mentioned variable geometry mechanism based on the detected drive condition; a first control system 107 for controlling a valve mechanism which drives a valve of the variable geometry mechanism using a revised control value based on a first objective supercharging pressure set value and a detected value obtained by the detection means 109, at the time when the control value obtained by the control value obtaining means 101 relates to a prescribed operating region of the internal combustion engine; a second control system 111 for controlling a valve mechanism which drives a valve for the exhaust bypass channel using a revised control valve based on a second objective supercharging pressure set value and the detected value obtained by the detection means 109 at the time when the control value obtained by the control value obtaining means 101 relates to non-prescribed operating region of the internal combustion engine; a cutoff means 115, for cutting off the compensated control by means of the first control system; and a recording control means 113 for controlling a valve mechanism which drives a valve for the exhaust gas bypass channel from a revised value recorded when an abnormality of the previously mentioned supercharging pressure control detection means is recognized and when the cutoff means is activated at the time when a malfunction or abnormality of the supercharging pressure detection means is recognized, and the compensated value calculated by means of the second control system is recorded.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

Referring to FIGS. 7–12, there is shown a supercharging pressure control device embodying the present invention.

Figure 8:
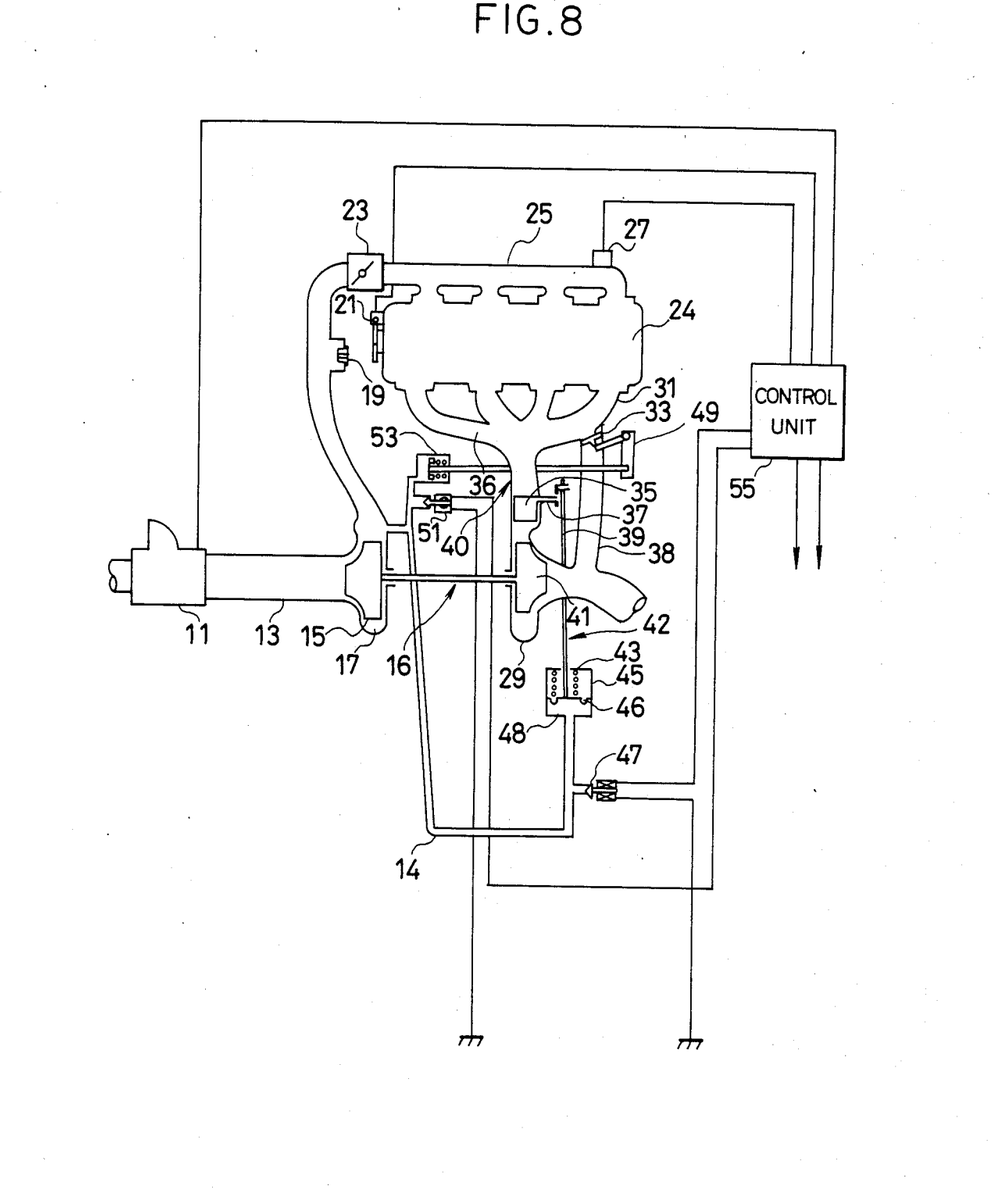
FIG. 8 is a drawing showing one embodiment of the supercharging pressure control device for a turbocharger in accordance with the present invention.

As shown in FIG. 8, intake air is introduced into an engine 24 through an intake air tube 13 and an intake air manifold 25. An air flowmeter 11, a compressor impeller housing 17 for a turbocharger 16, throttling valve 23, and a relief valve 19 are provided in the intake air tube 13. The air flowmeter 11 measures an intake air flow volume Qa and outputs this value to a control unit 55. A crank angle sensor 21 detects the RPM Ne of the engine 24 and outputs this value to the control unit 55. The intake air is pressurized by means of a compressor impeller 15 provided in the compressor impeller housing 17, and, after being regulated by the throttling valve 23, this intake air is divided and fed into the air tubes of the engine 24 by way of the intake air manifold 25. A supercharging pressure sensor 27, which will be subsequently described, is mounted in the intake air manifold 25.

Figure 9:
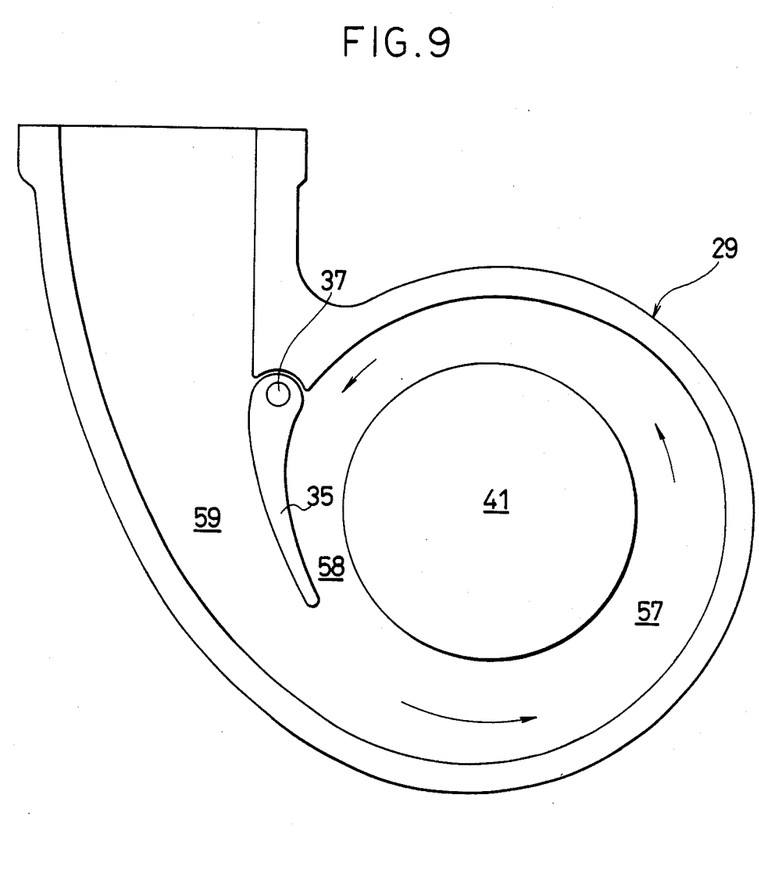
FIG. 9 is a sectional drawing of a variable capacity turbocharger shown in FIG. 8.

The exhaust gas from the engine 24 is collected in exhaust gas manifold 36 and exhausted through an exhaust gas pipe 40. A variable geometry means 42 and a turbine impeller housing 29 for the turbocharger 16 are provided in the exhaust gas pipe 40. A turbine impeller 41 which is linked to the compressor impeller 15 is housed in the turbine impeller housing 29. The flow velocity of the exhaust gas used in the turbine impeller 41 is varied by the variable geometry means 42. The variable geometry mechanism 42 comprises a movable tongue section 35 disposed at the inlet of scroll 57; a shaft 37 linked to a rod 39; an atmospheric chamber 45, a positive pressure chamber 48, and a diaphragm 46 which together form an actuator for opening and closing the movable tongue section 35; a solenoid valve 47 which controls air pressure in a channel 14 which accesses both the downstream side of the compressor impeller casing 17 of the intake air tube 13 and the positive pressure chamber 48. The solenoid valve 47 is controlled by a duty signal from the control unit 55. Within the atmospheric chamber 45 a spring 43 which energizes the diaphragm 46 is installed in the contracted position in the positive pressure chamber 48. The channel 14, which leads into the positive pressure chamber 48, is opened to atmosphere by the action of the solenoid valve 47. The diaphragm 46 drives the rod 39 and shaft 37 by an increase in pressure in the positive pressure chamber 48, and activates the movable tongue section 35 in the direction which increases the throat area of an exhaust gas introduction channel 59 in a scroll 57 which is illustrated in FIG. 9. The movable tongue section 35 is constructed so that it can be returned to its original position by the reversion of the pressure in the positive pressure chamber 48 to atmospheric pressure.

A waste gate valve 33 is provided in the exhaust gas bypass channel in the engine 24. The valve 33 is linked to an activating member 49 which is in turn linked to a diaphragm activator 53, and is constructed so that it controls the degree of opening of the exhaust gas bypass channel 38 by the duty control of the solenoid valve 51 provided near the diaphragm actuator 53 of the channel 14. The waste gate valve 33 functions as a supercharging pressure control means when the RPM of the engine 24 is in the region (C) illustrated in FIG. 6.

Referring to FIG. 9, there is shown the relationship of the variable geometry means 42 comprising the movable tongue 35 and the shaft 37, the turbine impeller 41, the scroll 57, and the exhaust-gas-introduction channel 59. The turbine impeller housing 29 contains the scroll 57 which is formed to surround the turbine impeller 41. The cross-sectional area of the scroll 57 gradually becomes smaller in the downstream direction (indicated by the arrows in the drawing) from the exhaust-gas-introducing channel 59. The movable tongue 35 is provided at the confluence of the exhaust-gas-introduction channel 59 and a scroll end-section 58, and this movable tongue 35 pivots on the shaft 37 in such a way as to expand or contract the introduction channel 59. The supercharging pressure decreases as the movable tongue 35 swings toward the scroll end-section 58, and increases as the tongue 35 swings in the direction of the exhaust-gas-introduction channel 59.

Figure 10:
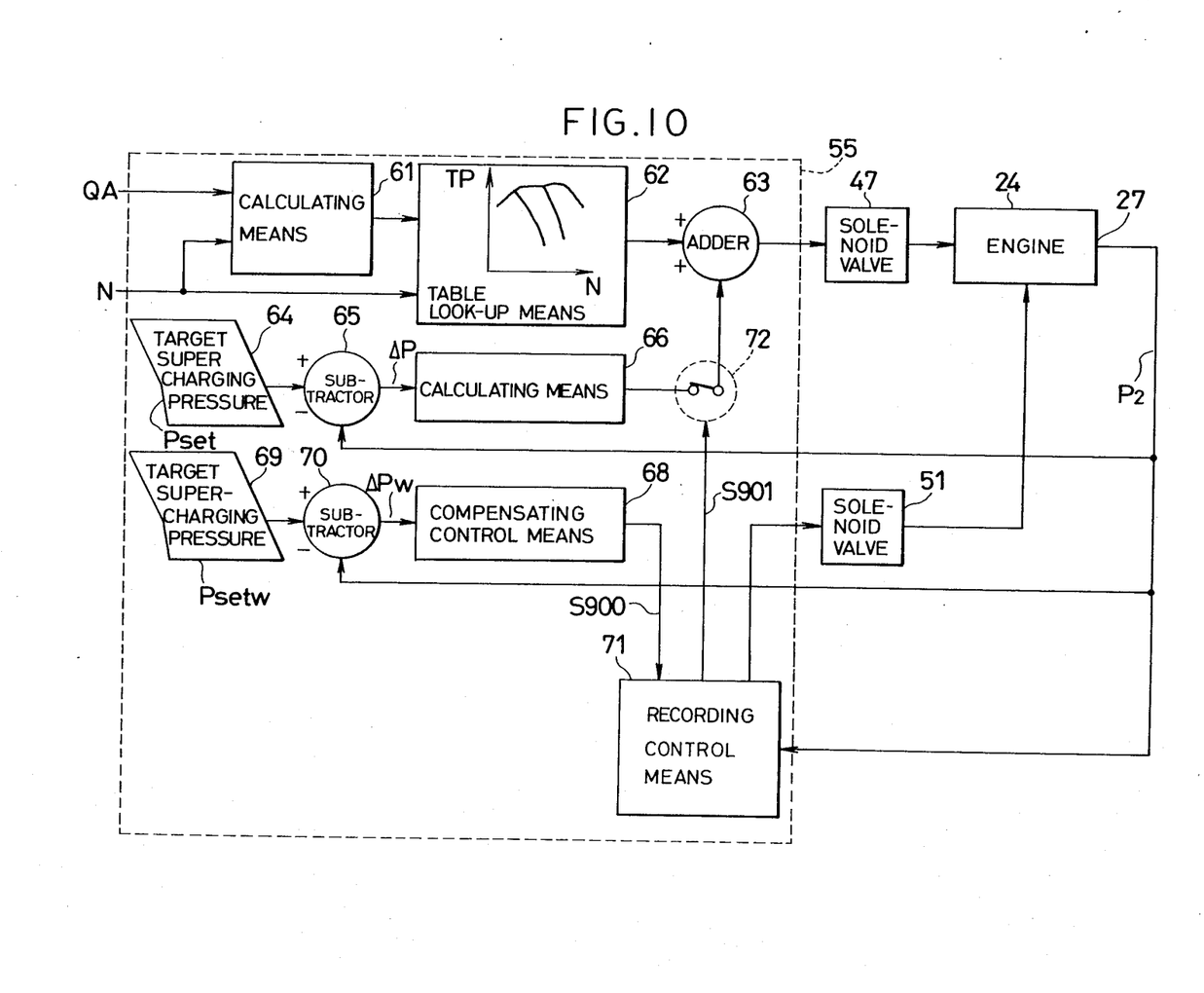
FIG. 10 is a block diagram of a supercharging pressure control device for a turbocharger in accordance with the present invention.

Referring to FIG. 10, as previously noted, there is shown a block diagram of one embodiment of a supercharging pressure control device for a turbocharger in accordance with the present invention. The control unit 55 comprises a microprocessor, a memory, and an input-output interface, and its basic action may be identical to the microcomputer for engine control. The control unit 55 comprises a plurality of calculating means 61 and 66, a table look-up means 62, an adder 63, a plurality of target supercharging pressure setting means 64 and 69, a plurality of subtractors 65 and 70, a compensating control means 68, a recording control means 71, and a cutout means 72. The calculating means 61 calculates a parameter Tp which represents the added load on the engine 24, based on the detected value Qa for intake air flow volume outputted from the air flowmeter 11 and the detected value Ne for the engine RPM outputted from the crank angle sensor 21. The parameter Tp indicates a time band of the ontime for the fuel flow volume control pulse for the electronically controlled gasoline injection device (EGI). The calculating means 61 calculates Tp in accordance with the equation:

$$Tp = KQa/Ne \text{ (where K is a constant)}$$

When the calculating device 61 has calculated Tp in accordance with the above equation, it outputs the value to the table look-up means 62.

Figure 6:
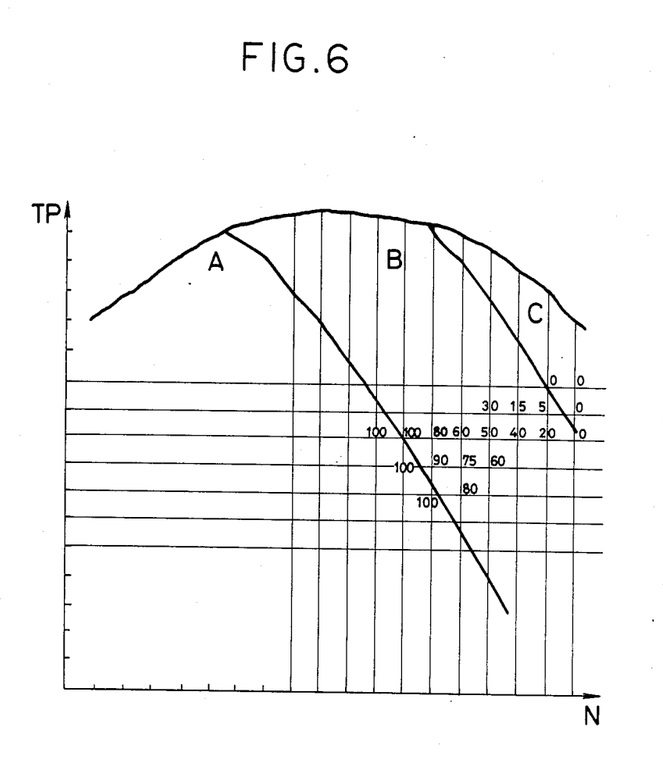
FIG. 6 is a graph illustrating the characteristics of an internal combustion engine equipped with a turbochager.
Figure 7:
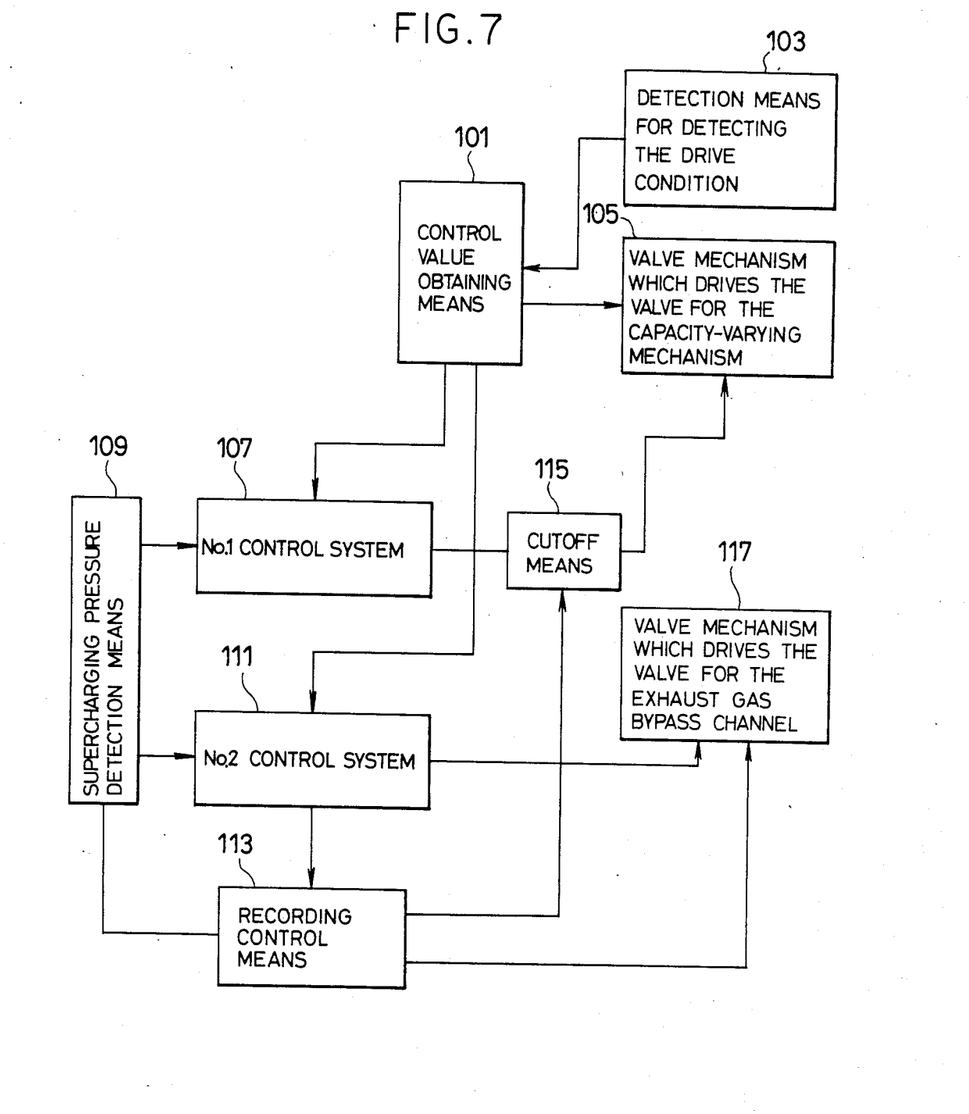
FIG. 7 is a block diagram of a supercharging pressure control device according to the present invention.

The table look-up means 62 receives the calculated value Tp outputted from the calculating means 61, the detected value Ne outputted from the crank angle sensor 21, for obtaining a duty value from a table such as that illustrated in FIG. 6, based on the values Tp and Ne, to drive the solenoid valve 47. This table contains the duty values for the solenoid valve 47 arranged as data to get the optimum supercharging pressure for each operating point. The duty values for the solenoid valve 47, corresponding to the optimum supercharging pressure at each engine operating point, are obtained experimentally.

The adder 63 adds the duty value obtained for the optimum supercharging pressure from the table look-up means 62 to the calculated value data outputted from the calculating means 66 (which will be later described), and controls the opening and closing of the solenoid valve 47 with the duty value corresponding to the supercharging pressure value resulting from this addition. The calculating means 61, the table look-up means 62, and the adder 63 make up one part of the control unit 55, and with the solenoid valve 47 and the engine 24 form the feed forward control system.

The target supercharging pressure setting means 64 sets the appropriate upper limit P set for the supercharging pressure for the engine 24, and outputs this set value P set to the subtractor 65. The subtractor 65 accepts the target supercharging pressure value P set, and calculates the difference ΔP between the value P set and the detected value P2 outputted from the supercharging pressure sensor which is mounted in the engine 24, and outputs this value to the calculating means 66. The calculating means 66 accepts the value P and performs, for example, proportional+integral+derivative action (subsequently referred to as PID action), and outputs the compensating portion of the duty ratio, which drives the solenoid valve 47 in accordance with the result of the PID action, to the adder 63. The adder 63 accepts the calculated result from the calculating device 66, and adds it to revise the drive duty value for the solenoid valve 47 from the table look-up means 62, and controls the opening and closing of the solenoid valve 47. The target supercharging pressure setting means 64, the subtractor 65, and the calculating means 66 make up the feed forward control system, which is an open loop control system provided in order to eliminate the drawback of lack of correspondence to variation in the parts. This control system forms the first feedback control system for compensating the supercharging pressure control by the feed forward system at the region (A) in FIG. 6, that is, the region of low rotation of the engine.

The target supercharging pressure setting means 69 sets the appropriate upper limit value P set for the supercharging pressure in the engine 24, and outputs this set value P set to the subtractor 70. The subtractor 70 accepts the appropriate upper limit value P set, calculates the difference ΔPw between the value P set and the detected value P2 from the supercharging pressure sensor 27, and outputs this value ΔPw to a compensating control means 68. The compensating control means 68 accepts the value ΔPw, which is outputted from the subtractor 65, and applies, for example, a PID action. It then applies compensating control to the drive duty value of the solenoid valve 51 so that supercharging pressure P2 of the engine 24 is revised to the target value P set. A compensated data value S900 which is the drive duty value for the solenoid valve 51 output by the compensating control means 68, is provided to a recording control means 71.

The recording control means 71 accepts the revised data value S900 provided by the compensating control means 68 and records it. The recording control means 71 maintains the previously recorded data until it is provided with the newly revised data value S900 from the compensating control means 68. The recording control means 71 accepts the detected value P2 from the supercharging pressure sensor 27, and judges whether or not, for example, a malfunction or abnormality such an abnormal broken line has been produced in the supercharging pressure sensor 27. The recording control means 71 controls the opening and closing of the solenoid valve 51 from the duty value based on the compensated data value S900. When the recording control means 71 judges that there has been a breakdown in the supercharging pressure sensor 27, it outputs a signal S901 to cut off the compensation of the supercharging pressure control being carried out by the feed forward control system by means of the first feedback control system. A cutoff means 72 which cuts off the calculating means 66 and the adder 63 is then activated. After the cutoff means 72 is activated, the recording control means 71 thereafter controls the opening and closing of the solenoid valve 51 by using the data S900 obtained immediately before recognition of an abnormality in the supercharging pressure sensor 27.

Figure 11:
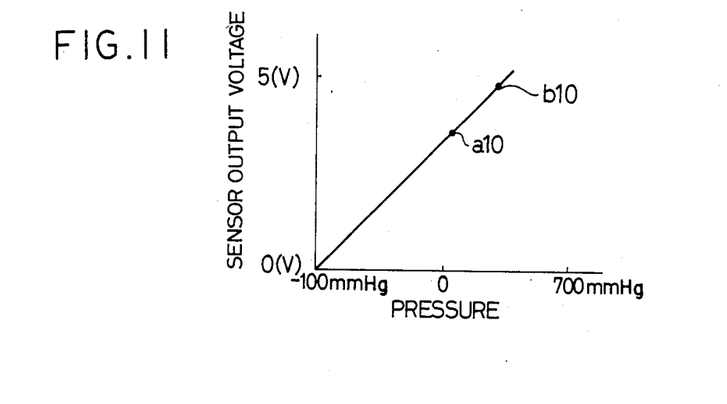
FIG. 11 is a graph showing the output characteristics of a supercharging pressure sensor shown in FIG. 8.

A pressure sensor which has characteristics such as those illustraed in FIG. 11 is used as the supercharging pressure sensor 27. If the output voltage of the supercharging pressure sensor 27 is in the region a10 to b10 in FIG. 11, the RPM of the engine 24 is in the region (C) in FIG. 6.

The target supercharging pressure setting means 69, the subtractor 70, the compensating control means 68, the recording control means 71, and the solenoid valve 51, form the second feedback control system which revises the supercharging pressure control of the feed forward control system for the region (C) in FIG. 6, that is, for the high speed, high load operating region of the engine.

Figure 12:
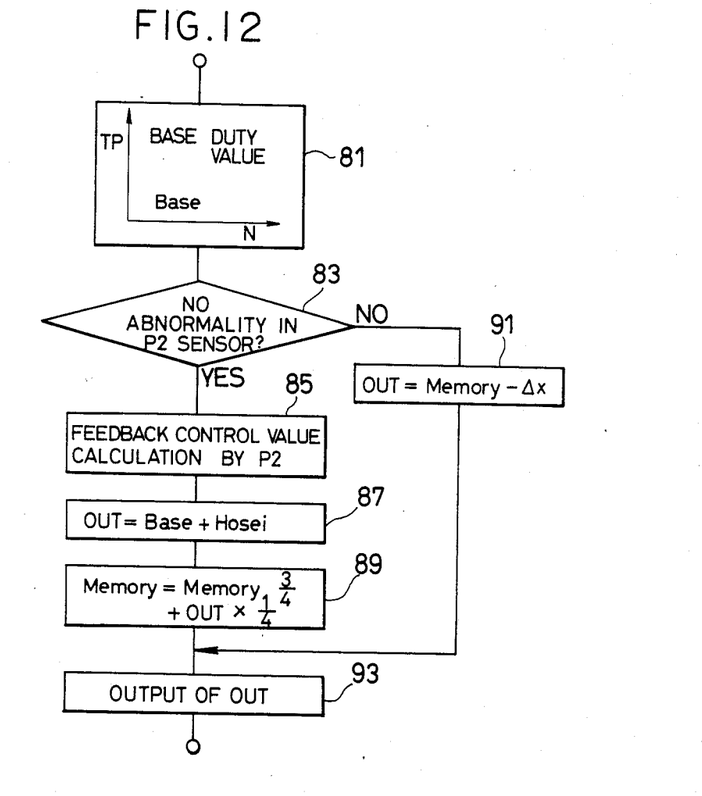
FIG. 12 is a flow chart for control process of the device shown in FIG. 10.

These control actions will be explained with reference mainly to the flowchart in FIG. 12.

When the value Qa detected at the air flowmeter 11, and the value Ne detected by the crank angle sensor 21, are respectively inputted to the control unit 55, the calculating unit 61 calculates Tp and outputs this value to the table look-up device 62. The table look-up device 62 retrieves a table which is based on the input Tp and the value Ne detected by the crank angle sensor 21. If the operating region obtained from the detected value Ne and the calculated value Tp falls in the region (A) in FIG. 6, the control for obtaining an appropriate supercharging pressure is carried out by combining the control from the feed forward control system and the control from the first feedback control system or revising the control carried out by the feed forward control system. That is, in this case, the opening and closing of the solenoid valve 47 is controlled from the duty value corresponding to an appropriate supercharging pressure which corresponds to the engine operating status. If, for example, the drive duty value obtained at the solenoid valve 47 by the adder 63 is 100%, the solenoid valve 47 would be fully opened. This would cause the positive pressure chamber 48 to assume atmospheric pressure, and the movable tongue 35 would cause the cross-sectional area of the introduction channel 59 to assume minimum status (i.e. completely closed status), causing the supercharging pressure to increase. Furthermore, in the region (A) of FIG. 6, since the cross-sectional area of the introduction channel 59 is at its minimum, the supercharging pressure P2 will not reach the set value, for example, 350 mm Hg.

If the operating region obtained from the detected value Ne, which is inputted to the table look-up means 62, and from the calculated value Tp falls within the region (C) in FIG. 6, the control to obtain the appropriate supercharging pressure is the control from the feed forward control system combined with the control from the second feedback control system for compensating the feed forward control. Accordingly, the table look-up means 62 carries out table retrieval (Step 81) in order to perform control in region (C) in FIG. 6. The feed forward control system acts to obtain an appropriate supercharging pressure based on the data retrieved by the table look-up means 62. The recording control means 71 outputs a drive instruction signal to the solenoid valve 51 with a duty value based on the revised data value S900 obtained from the compensating control means 68. If, for example, a drive duty ratio of 0% is issued to the solenoid valve 51 from the recording control means 71, the solenoid valve 51 assumes the fully closed position. For this reason, the pressure within the diaphragm actuator rises, the actuating means 49 moves in the right hand direction in FIG. 8, the waste gate valve 33 opens, and the supercharging pressure drops. In this way, the recording control means 71 carries out control by varying the duty value, so that the supercharging pressure P2 of the engine 24 is controlled to the appropriate supercharging pressure P set W. The recording control means 71 can determine if there are any abnormalities present by comparing the detected value P2, from the supercharging pressure sensor 27, with data previously stored in memory, such as the sensor characteristics shown in FIG. 11 (Step 83). When the recording control means 71 determines that there are no abnormalities present in Step 83, it next proceeds to Step 85.

The subtractor 70 calculates the difference ΔPw between P2 and P set W and outputs this value to the compensating control means 68 (Step 85).

The compensating control means 68 adds ΔPw to the supercharging pressure data value retrieved by the table look-up control means 62, and outputs this data to the recording control means 71 (Step 87). The recording control means 71 multiplies the value P set W set by the target supercharging pressure setting means 69 by a factor such as ¾. In the following step, the resulting value is added to the revised data value from the compensating control means 68 multiplied by a factor of ¼ (Step 89). The recording control means 71 sets the drive duty value for the solenoid value 51, using the value obtained from Step 89, and outputs an open/close control signal to the solenoid valve 51 (Step 93).

When the recording control means 71 determines in Step 83 that abnormalities are present, it moves to Step 91. The recording control means 71 subtracts a fixed value Δx from the revised data value S900 obtained from the compensating control means 68 immediately before an abnormality was discovered in the supercharging pressure sensor 27, and outputs a open signal S901 to the cutoff means 72 (Step 91), then proceeds to Step 93. The fixed value Δx is subtracted from the revised data value S900 in Step 91 in consideration of the safety of the engine 24.

Although the above explanation was made with reference to one embodiment of the present invention, the present invention is not limited to this embodiment only. For example, a step motor may be used in place of the variable geometry means 42. In addition, the method of controlling the supercharging pressure is not limited to that method described in the flow sheet of FIG. 12.

What is claimed is:

1. In turbocharger in which an exhaust gas turbine is driven in a rotating manner by the energy of the exhaust gases from an internal combustion engine through an exhaust gas channel and the intake air in the internal combustion engine is supercharged by a compressor which is driven in a rotating manner by the exhaust gas turbine, a supercharging pressure control device comprising:

drive means for driving a valve of a variable geometry mechanism which varies the flow area in the exhaust gas channel;

drive means for driving a valve provided in a bypass channel into which the exhaust gas is introduced to bypass the exhaust gas turbine;

detection means for detecting the supercharging pressure of the inlet air to the internal combustion engine;

control value obtaining means for obtaining a value for controlling said variable geometry mechanism drive means, said control value obtaining means calculating a value which represents load applied to the engine and, based on said calculated value and the RPM of the engine, obtaining said control value;

first control means for controlling said variable geometry mechanism drive means, using a control value obtained by compensating the control value from said control value obtaining means in accordance with a first target supercharging pressure set value and the detected value obtained by said detection means at the time when the engine is in a predetermined operating region;

second control means for controlling said bypass channel valve drive means, using a control value obtained by compensating the control value from said control value obtaining means in accordance with a second target supercharging pressure set value and the detected value obtained by said detection means at the time when the engine is in another operating region;

cutoff means for cutting off the compensating control by said first control means; and recording control means for recording a compensated value from said second control means and for controlling said bypass channel valve drive means by activating said cutoff means when said recording control means judges that said supercharging pressure detection means malfunctions, said activation of the cutoff means being carried out according to a compensated value being stored in said recording control means at the time when said malfunction is recognized by said recording control means.

2. A supercharging pressure control device as claimed in claim 1, in which the predetermined operating region is a region of low rotation of the engine.

3. A supercharging pressure control device as claimed in claim 1, in which the first target supercharging pressure set value is set by a first target supercharging pressure setting means, and the second target supercharging pressure set value is set by a second target supercharging pressure setting means.

4. A supercharing pressure control device as claimed in claim 1, in which the variable geometry mechanism comprises a movable tongue section provided in the exhaust gas upstream side of the exhaust gas pipe, a shaft linked to a rod, an atmospheric chamber, a positive pressure chamber, and a diaphragm which together form an actuator for opening and closing the movable tongue section.

5. A supercharging pressure control device as claimed in claim 4, in which the variable geometry mechanism drive means comprises a first solenoid valve which opens and closes a channel which accesses both the downstream side of a compressor impeller casing of the intake air tube and the positive pressure chamber.

6. A supercharging pressure control device as claimed in claim 1, in which the bypass channel valve in the bypass channel is a waste gate valve which is linked to an activating member linked to a diaphragm activator.

7. A supercharging pressure control device as claimed in claim 6, in which the bypass channel valve drive means is a second solenoid valve provided near the diaphragm actuator of a channel which accesses both the downstream side of the compressor impeller casing of the intake air tube and the diaphragm actuator.

8. A supercharging pressure control device as claimed in claim 5, in which said control value obtaining means comprises calculating means which calculates a parameter which represents the added load on the engine based on a detected value for intake air flow value outputted from an air flowmeter and a detected value for a engine RPM outputted from a crank angle sensor; and table look-up means which receives the calculated value outputted from the calculating means and the detected value outputted from the crank engine angle sensor for obtaining a duty value from a table based on the values and to drive the solenoid valve.

9. A supercharging pressure control device as claimed in claim 8, in which said first control means comprises first target supercharging pressure setting means which sets a first target supercharging pressure set value which is an appropriate first upper limit for the supecharging pressure;

a subtractor which accepts the target supercharging pressure value for calculating the difference between the first target supercharging pressure set and the detected value outputted from the supercharging pressure sensor which is mounted in the engine;

calculating means which accepts the value for performing proportional+integral+derivative action to output the compensating portion of the duty ratio which drives the first solenoid valve in accordance with the result of the PID action; and an adder which accepts the calculated result from the calculating means and adds it to revise the drive duty value for the solenoid valve from the table look-up means to control the opening and closing of the first solenoid valve.

10. A supercharging pressure control device as claimed in claim 9, in which said second control means comprises second target supercharging pressure setting means which sets a second target supercharging pressure set value which is an appropriate second upper limit for the supercharging pressure;

a subtractor which accepts the second appropriate upper limit value for calculating the difference between the second target supercharging pressure set value and the detected value outputted from the supercharging pressure seonsor; and compensating control means which accepts the difference value outputted from the subtractor for applying a PID action to the difference value to apply compensating control to the drive duty value of the second solenoid yalve so that supercharging pressure of the engine is revised to the second target value.

11. A supercharging pressure control device as claimed in claim 10, in which said recording control means accepts the revised data value provided by the compensating control means to record the revised data value.

* * * * *